United States Patent
Maeda et al.

(10) Patent No.: US 9,663,084 B2
(45) Date of Patent: May 30, 2017

(54) ROTATING PUMPING APPARATUS WITH SEAL MECHANISM

(71) Applicants: DENSO CORPORATION, Kariya, Aichi-pref. (JP); Advics Co., Ltd., Kariya, Aichi-pref. (JP)

(72) Inventors: Junichi Maeda, Takahama (JP); Yoshitake Hisada, Kariya (JP); Toshiya Hayashi, Yokkaichi (JP); Shinya Mitani, Mie-ken (JP)

(73) Assignee: ADVICS CO., LTD., Kariya, Aichi-pref. (JP)

( * ) Notice: Subject to any disclaimer, the term of this patent is extended or adjusted under 35 U.S.C. 154(b) by 428 days.

(21) Appl. No.: 14/509,364

(22) Filed: Oct. 8, 2014

(65) Prior Publication Data
US 2015/0096294 A1    Apr. 9, 2015

(30) Foreign Application Priority Data
Oct. 9, 2013    (JP) ................. 2013-212112

(51) Int. Cl.
| | | |
|---|---|---|
| F15B 7/10 | (2006.01) |
| B60T 11/22 | (2006.01) |
| B60T 11/224 | (2006.01) |
| B60T 11/34 | (2006.01) |
| F04C 2/10 | (2006.01) |
| F04C 11/00 | (2006.01) |
| F04C 15/00 | (2006.01) |

(Continued)

(52) U.S. Cl.
CPC ............. B60T 11/22 (2013.01); B60T 8/4031 (2013.01); B60T 11/224 (2013.01); B60T 11/34 (2013.01); F04C 2/102 (2013.01); F04C 11/001 (2013.01); F04C 15/0038 (2013.01); B60T 8/4872 (2013.01)

(58) Field of Classification Search
CPC ........ B60T 11/22; B60T 11/34; B60T 8/4031; F04C 2/102; F04C 11/001; F04C 15/0038
See application file for complete search history.

(56) References Cited

U.S. PATENT DOCUMENTS

| | | | |
|---|---|---|---|
| 6,402,266 B1 * | 6/2002 | Ariki .................... B60T 8/34 | |
| | | | 303/116.4 |
| 2012/0080936 A1 | 4/2012 | Hisada | |

FOREIGN PATENT DOCUMENTS

| | | |
|---|---|---|
| JP | 2005-030558 | 2/2005 |
| JP | 2005-188393 | 7/2005 |
| JP | 2012-077762 | 4/2012 |

* cited by examiner

Primary Examiner — Thomas E Lazo
Assistant Examiner — Daniel Collins
(74) Attorney, Agent, or Firm — Harness, Dickey & Pierce, P.L.C.

(57) ABSTRACT

A rotating pumping apparatus is provided which may be employed in an automotive brake system. The rotating pumping apparatus includes a sealing member and a pressure member. The sealing member is disposed around a pump drive shaft. The pressure member includes a plate spring, a first rotation stopper, and a second rotation stopper. The first rotation stopper serves to stop the pressure member from rotating following rotation of the pump drive shaft. The second rotation stopper engages the seal ring to stop the sealing member from rotating following the rotation of the pump drive shaft. The plate spring works to elastically press the sealing member against a stopper wall of a pump casing to stop the sealing member from moving in an axial direction of the pump drive shaft.

8 Claims, 6 Drawing Sheets

(51) Int. Cl.
 *B60T 8/40* (2006.01)
 *B60T 8/48* (2006.01)

ROTATING PUMPING APPARATUS WITH SEAL MECHANISM

CROSS REFERENCE TO RELATED DOCUMENT

The present application claims the benefit of priority of Japanese Patent Application No. 2013-212112 filed on Oct. 9, 2013, the disclosure of which is incorporated herein by reference.

BACKGROUND OF THE INVENTION

1. Technical Field of the Invention

This disclosure relates generally to a rotating pumping apparatus with a sealing mechanism in which a sealing member made of up a resinous ring and a rubber ring is disposed in a clearance between a pump casing and a shaft extending in the pump casing, and the resinous ring is placed in close contact with the shaft to create a hermetic seal therebetween, and also to a brake system for a vehicle using such a rotating pumping apparatus.

2. Background Art

Japanese Patent First Publication No. 2012-77762 teaches a brake system equipped with a rotating pump (also called a rotary pump). The rotating pump includes a pump casing, a pump drive shaft, and a sealing member. The sealing member consists of a resinous body and a rubber ring and is disposed between the pump drive shaft and the pump casing to minimize leakage of brake fluid through a clearance between the pump drive shaft and the pump casing. Specifically, the resinous body is placed in contact with the outer periphery of the pump drive shaft, while the rubber ring is disposed in contact with the inner wall of the pump casing so as to elastically press the resinous body against the pump drive shaft to create a hermetic seal therebetween.

The resinous body has an end with a cut-out recess. The cut-out recess has a slant wall which extends in axial and radial directions of the resinous body. The pump casing is equipped with a pin inserted into the cut-out recess of the resinous body. The cut-out recess and the pin function as a rotation stopper. When the resinous body is rotated following rotation of the pump drive shaft, it will cause the pin to hit the slant surface of the cut-out recess, thereby stopping the sealing member from rotating following the rotation of the pump drive shaft. Upon hitting of the pin on the slant surface, the slant surface works to convert the torque of the pump drive shaft into force which elastically urges the resinous body into abutment with a stopper wall of the pump casing, thereby stopping the sealing member from moving in the axial direction of the pump drive shaft.

The above described prior art structure, however, encounters the drawback in that when the degree of friction, as developed between the rubber ring and the resinous body, is greater than the above force into which the torque of the pump drive shaft is converted by the hitting of the pin with the slant surface of the resinous body, it will result in a lack in elastically pressing the resinous body against the stopper wall to stop the linear movement of the sealing member.

SUMMARY OF THE INVENTION

It is therefore an object of this disclosure to provide an improved structure of a rotating pumping apparatus which is equipped with a drive shaft and a sealing member and designed to stop the sealing member from moving in an axial direction of the drive shaft as well as rotating following rotation of the drive shaft regardless of torque of the drive shaft, and also to provide a brake system for a vehicle equipped with such a rotating pumping apparatus.

According to one aspect of the invention, there is provided a rotating pumping apparatus which may be employed in a brake system for automotive vehicles. The rotating pumping apparatus comprises: (a) a rotating pump; (b) a shaft which drives the rotating pump; (c) a casing which has formed therein a hole in which the shaft extends and rotates, the casing also including a stopper wall which extends inside the hole; (d) a sealing member which is equipped with a ring and an elastic seal fit on the ring and disposed around the shaft to create a hermetical seal between an inner periphery of the hole and an outer periphery of the shaft; and (e) a pressure member which includes a plate spring, a first rotation stopper, and a second rotation stopper. The plate spring works to elastically press the sealing member against the stopper wall of the casing to stop the sealing member from moving in an axial direction of the shaft. The first rotation stopper serves to stop the pressure member from rotating following rotation of the shaft. The second rotation stopper serves to engage the ring to stop the sealing member from rotating following the rotation of the shaft.

Specifically, the pressure member produces elastic pressure to press the sealing member against the stopper wall of the casing. In fact, the elastic pressure is developed by the plate spring. This keeps the sealing member from moving in the axial direction of the shaft without relying on torque which is created by the rotation of the shaft and exerted on the sealing member or resistance to the rotation of the ring of the sealing member which arises from the friction of the sealing member against the shaft.

According to another aspect of the disclosure, there is provided a brake system for a vehicle which comprises: (a) a brake actuating member; (b) a master cylinder which works to produce a brake fluid pressure in response to an operation of the brake actuating member; (c) a wheel cylinder which works to produce a brake force in response to the brake fluid pressure; (d) a main hydraulic path which connects between the master cylinder and the wheel cylinder; (e) a pressure-increasing valve which is disposed in the main hydraulic path and serves to control increasing of the brake fluid pressure applied to the wheel cylinder; (f) a pressure-reducing path which connects with a junction of the pressure-increasing valve and the wheel cylinder in the main hydraulic path; (g) a pressure-reducing valve which is disposed in the pressure-reducing path and works to control reducing of the brake fluid pressure applied to the wheel cylinder; (h) a reservoir which stores therein brake fluid which is discharged from the main hydraulic path through the pressure-reducing path when the pressure-reducing valve is opened; (i) a recirculating path which extends from the reservoir and connects with a junction of the master cylinder and the pressure-increasing valve; (j) a rotating pumping apparatus; and (k) a controller which performs an anti-lock brake control mode to increase or decrease the brake fluid pressure applied to the wheel cylinder to avoid skidding of a wheel of a vehicle, and returns the brake fluid from the reservoir to the main hydraulic path through the rotating pumping apparatus. The rotating pumping apparatus includes (1) rotating pump, (2) a shaft which drives the rotating pump, (3) a casing which has formed therein a hole in which the shaft extends and rotates, the casing also including a stopper wall which extends inside the hole, (4) a sealing member which is equipped with a ring and an elastic seal fit on the ring and disposed around the shaft to create a hermetical seal between an inner periphery of the hole and an outer periphery of the shaft, and (5) a pressure member which includes a plate spring, a first rotation stopper, and a second rotation stopper. The plate spring works to elastically press the sealing member against the stopper wall of the casing to stop the sealing member from moving in an axial direction of the shaft. The first rotation stopper serves to stop the pressure member from rotating following rotation of the shaft. The second rotation stopper serves to engage the ring to stop the sealing member from rotating following the rotation of the shaft.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings wherein like reference numbers refer to like or equivalent parts in several views.

First Embodiment

Figure 1:
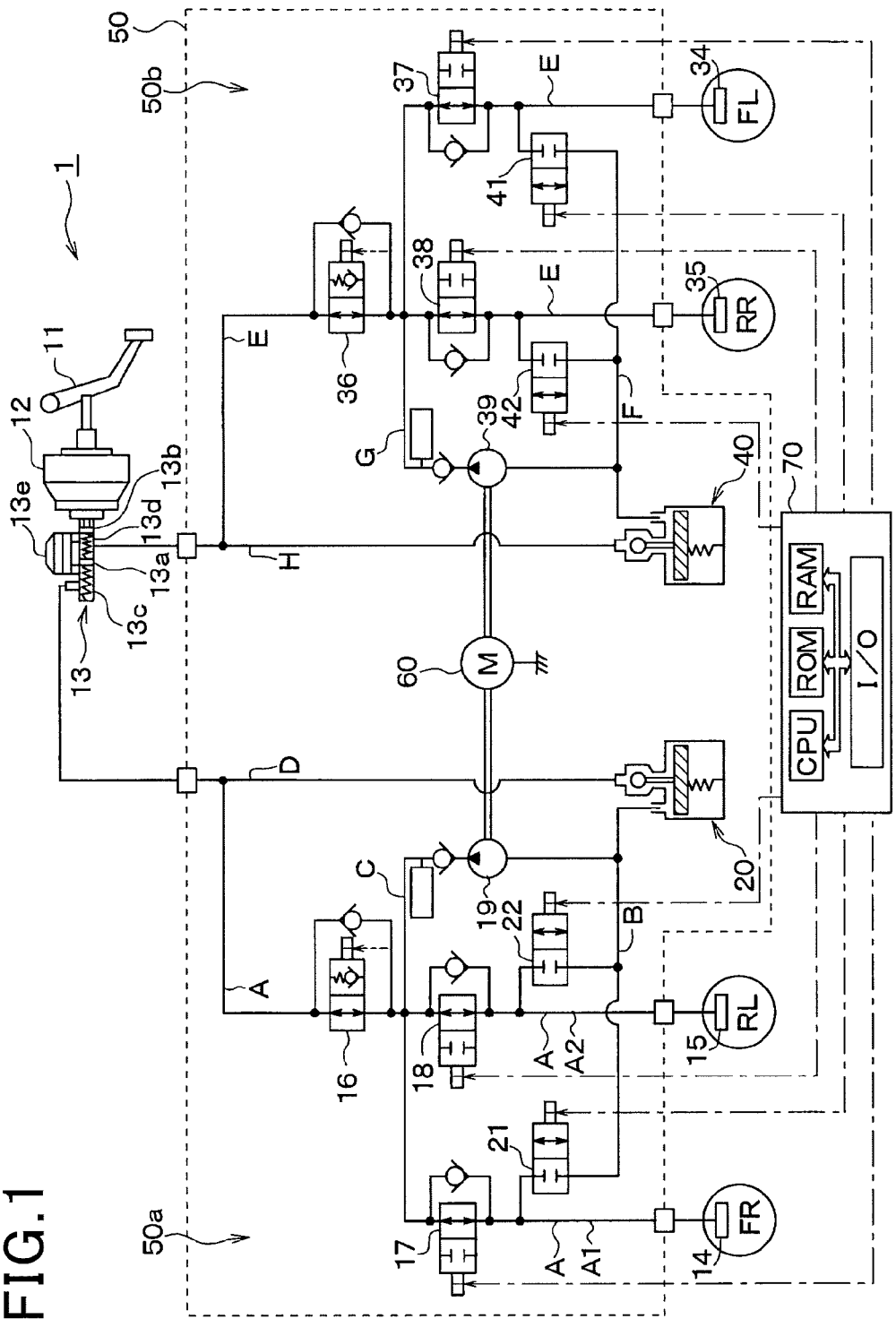
FIG. 1 is a circuit diagram which illustrates a brake system equipped with a rotating pumping apparatus according to the first embodiment of the invention.

Referring to FIG. 1, there is shown an automotive brake system equipped with a rotating pumping apparatus according to the first embodiment of the invention. The brake system, as referred to herein, is used with a front-wheel-drive vehicle equipped with a so-called diagonal split system which includes two brake hydraulic circuits one of which controls the right front and the left rear wheel and the other of which controls the left front and the right rear wheel, but may be used with a front/rear split system.

The brake system includes a brake device 1 which is equipped with a brake pedal 11 (i.e., a brake actuating member) to be depressed by a vehicle occupant or driver for applying the brakes to the vehicle, a brake booster 12, a master cylinder 13, wheel cylinders 14, 15, 34, and 35, and a brake pressure control actuator 50. The master cylinder 13, as will be described later in detail, works to produce a braking hydraulic pressure in response to an operation of the brake actuating member (i.e., the brake pedal 11). The actuator 50 has a brake ECU (Electronic Control Unit) 70 installed therein. The brake ECU 70 works to control the braking force, as developed by the brake device 1.

The brake pedal 11 is connected to the brake booster 12 and the master cylinder 13. When the driver of the vehicle depresses the brake pedal 11, the brake booster 12 works to boost the pressure applied to the brake pedal 11 and push master pistons 13a and 13b installed in the master cylinder 13, thereby developing the same pressure (which will also be referred to as M/C pressure below) in a primary chamber 13c and a secondary chamber 13d which are defined by the master pistons 13a and 13b. The M/C pressure is then transmitted to the wheel cylinders 14, 15, 34, and 35 through the actuator 50 which is equipped with hydraulic pressure paths.

A master reservoir 13e is connected to the master cylinder 13. The master reservoir 13e has fluid paths communicating with the primary chamber 13c and the secondary chamber 13d, respectively. The master reservoir 13e works to supply the brake fluid to the master cylinder 13 or store therein an excess of the brake fluid in the master cylinder 13.

The actuator 50 includes a first hydraulic circuit 50a and a second hydraulic circuit 50b. The first hydraulic circuit 50a is a hydraulic circuit working to control the brake fluid to be applied to the right front wheel FR and the left rear wheel RL. The second hydraulic circuit 50b is a hydraulic circuit working to control the brake fluid to be applied to the left front wheel FL and the right rear wheel RR.

The first hydraulic circuit 50a and the second hydraulic circuit 50b are identical in structure with each other. For the brevity of disclosure, the following discussion will refer only to the first hydraulic circuit 50a below.

The first hydraulic circuit 50a is equipped with a main hydraulic line A (also called a main hydraulic path below) through which the M/C pressure is transmitted to the wheel cylinder 14 for the right front wheel FR and the wheel cylinder 15 for the left rear wheel RL to produce wheel cylinder pressures (which will also be referred to as W/C pressures below) which create the braking force.

The main hydraulic line A has disposed therein a differential pressure control valve 16 which is operable in either of two modes: an open mode and a pressure-difference mode. In a normal braking mode where it is required to produce the braking force as a function of an amount of depression of the brake pedal 11 by the driver, that is, a motion control mode is entered, the valve position of the differential pressure control valve 16 is placed in the open mode. The differential pressure control valve 16 is equipped with a solenoid coil. When the solenoid coil is energized electrically, the valve position of the differential pressure control valve 16 is moved and placed in the pressure-difference mode. Specifically, when the current supplied to the solenoid coil is increased, it sets the differential pressure control valve 16 to the pressure-difference mode. When entering the pressure-difference mode, the differential pressure control valve 16 works to control the flow of the braking fluid to elevate the W/C pressures above the M/C pressure by a pressure difference, as developed by the differential pressure control valve 16.

The main hydraulic line A is equipped with two branch lines: a hydraulic line A1 and a hydraulic line A2 which extend downstream of the differential pressure control valve 16 to the wheel cylinders 14 and 15, respectively. The hydraulic line A1 is equipped with a pressure-increasing valve 17 to increase the pressure of the brake fluid supplied to the wheel cylinder 14. Similarly, the hydraulic line A2 is equipped with a pressure-increasing valve 18 to increase the pressure of the brake fluid supplied to the wheel cylinder 15.

Each of the pressure-increasing valves 17 and 18 is implemented by a normally-open two-position valve which is opened or closed by the brake ECU 70 to control increasing of the braking hydraulic pressure (i.e., the pressure of the brake fluid applied to the wheel cylinder 14 or 15). Specifically, when a solenoid coil installed in the pressure-increasing valve 17 is deenergized, the pressure-increasing valve 17 is opened. Alternatively, the solenoid coil is energized, the pressure-increasing valve 17 is closed. The same is true for the pressure-increasing valve 18.

The actuator 50 also includes a hydraulic line B which extends as a pressure-reducing path between a junction of the pressure-increasing valve 17 and the wheel cylinder 14 and a pressure control reservoir 20 and between a junction of the pressure-increasing valve 18 and the wheel cylinder 15 and the pressure control reservoir 20. The hydraulic line B is equipped with pressure-reducing valves 21 and 22.

The hydraulic line B has installed therein pressure-reducing valves 21 and 22 which are each implemented by a normally closed two-position solenoid valve to control decreasing of the braking hydraulic pressure (i.e., the pressure of the brake fluid applied to the wheel cylinder 14 or 15). Specifically, when deenergized, the pressure-reducing valves 21 and 22 are closed. When energized, the pressure-reducing valves 21 and 22 are opened.

The actuator 50 also includes a hydraulic line C which extends as a recirculating path between the pressure control reservoir 20 and the hydraulic line A. The hydraulic line C is equipped with a self-priming gear pump 19 which is driven by an electric motor 60 to suck the brake fluid from the pressure control reservoir 20 and feed it to the master cylinder 13 or the wheel cylinders 14 and 15.

The actuator 50 also includes a hydraulic line D which extends as a sub-hydraulic line between the pressure control reservoir 20 and the master cylinder 13. In the motion control mode such as a traction control mode or an electronic stability control mode (i.e., a lateral slippage control mode), the gear pump 19 works to suck the brake fluid from the master cylinder 13 through the hydraulic line D and output it to a required one of the wheel cylinders 14 and 15 through the hydraulic line A to increase the W/C pressure of a target one of the wheels.

The second hydraulic circuit 50b is, as already described, substantially identical in structure with the first hydraulic circuit 50a. Specifically, the second hydraulic circuit 50b is equipped with a differential pressure control valve 36, pressure-increasing valves 37 and 38, pressure-reducing valves 41 and 42, a pressure control reservoir 40, and a gear pump 39. The differential pressure control valve 36 corresponds to the differential pressure control valve 16. The pressure-increasing valves 37 and 38 correspond to the pressure-increasing valves 17 and 18. The pressure-reducing valves 41 and 42 correspond to the pressure-reducing valves 21 and 22. The pressure control reservoir 40 corresponds to the pressure control reservoir 20. The gear pump 39 corresponds to the gear pump 19. The second hydraulic circuit 50b also includes hydraulic lines E, F, G, and H which correspond to the hydraulic lines A, B, C, and D. The brake device 1 has the above described hydraulic system. The rotating pumping apparatus, as referred to in this embodiment, is equipped with an assembly of the gear pumps 19 and 39 working as rotating pumps. The structure of the rotating pumping apparatus will be described later in detail.

The brake ECU 70 serves as a controller in the brake device 1 and is implemented by a typical microcomputer made up of a CPU, a ROM, a RAM, an I/O device, etc. The brake ECU 70 executes various operations, as instructed by programs stored in the ROM to control the motion of the vehicle in the motion control mode such as an anti-lock brake control mode or an electronic stability control mode. Specifically, the brake ECU 70 calculates physical quantities, as indicated by outputs of sensors (not shown), and determines whether the motion control mode should be performed or not using the calculated physical quantities. When it is required to perform the motion control mode, the brake ECU 70 calculates a controlled variable for a target one of the wheels, that is, a target W/C pressure to be developed in a corresponding one of the wheel cylinders 14, 15, 35, or 34 and then controls the operations of the valves 16 to 18, 21, 22, 36 to 38, 41, and 42 and the operation of the motor 60 which drives the gear pumps 19 and 39 to achieve the target W/C pressure.

When the master cylinder 13 produces no pressure, for example, in the traction control mode or the electronic stability control mode, the brake ECU 70 activates the gear pump 19 and 39 and places the differential pressure control valves 16 and 36 in the pressure difference mode, thereby supplying the brake fluid downstream of the differential pressure control valves 16 and 36, that is, to the wheel cylinders 14, 15, 34, and 35 through the hydraulic lines D and H. The brake ECU 70 then selectively controls the operations of the pressure-increasing valves 17, 18, 37, and 38 or the pressure-reducing valves 21, 22, 41, and 42 to increase or decrease the W/C pressure in a target one(s) of the wheel cylinders 14, 15, 34, and 35 into agreement with a target value.

When the anti-lock brake control mode is entered, that is, the anti-lock brake system (ABS) is activated, the brake ECU 70 increases or decreases the pressure of the brake fluid applied to the wheel cylinders 14, 15, 34, and 35 to avoid skidding of the wheels FR, FL, RL, and RR. Specifically, the brake ECU 70 selectively controls the operations of the pressure-increasing valves 17, 18, 37, and 38 or the pressure-reducing valves 21, 22, 41, and 42 to increase or decrease the W/C pressure in a target one(s) of the wheel cylinders 14, 15, 34, and 35 into agreement with a target value.

Figure 2:
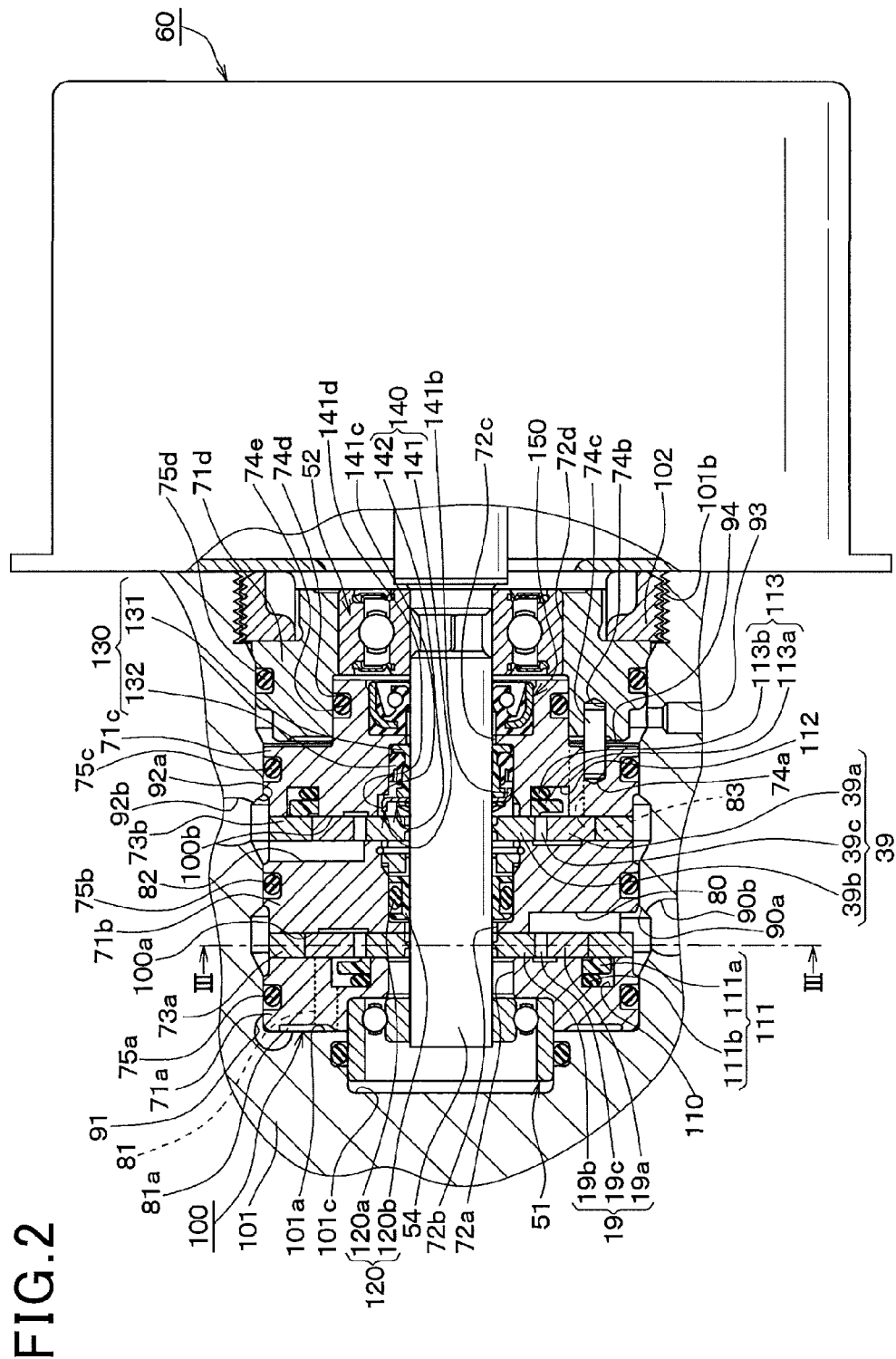
FIG. 2 is a partially sectional view which illustrates a pump body of the rotating pumping apparatus secured to a housing of an actuator.

The structure of the rotating pumping apparatus, that is, the structure of the gear pumps 19 and 39 installed in the brake device 1 will be described below with reference to FIG. 2. FIG. 2 is a partially sectional view which illustrates a pump body 100 of the rotating pumping apparatus secured to a housing 101 of the actuator 50. The vertical direction in the drawing is the vertical direction of the vehicle.

The automotive brake system is, as described above, equipped with two hydraulic systems: the first hydraulic circuit 50a and the second hydraulic circuit 50b and thus has the pump body 100 made up of the gear pump 19 for the first hydraulic circuit 50a and the gear pump 39 for the second hydraulic circuit 50b.

The gear pumps 19 and 39 installed in the pump body 100 are driven by rotation of a shaft 54 through the motor 60. The shaft 54 is retained by a first bearing 51 and a second bearing 52. A casing which will also be referred to as a pump casing below and serves as an outer shell or housing of the pump body 100 is made up of a first, a second, a third, and a fourth cylinder 71a, 71b, 71c, and 71d (which will also be referred to as side plates below) and a first and a second center plate 73a and 73b. The first and second center plates 73a and 73b are cylindrical. The first bearing 51 is mounted in the first cylinder 71a. The second bearing 52 is mounted in the fourth cylinder 71d.

The first cylinder 71a, the first center plate 73a, the second cylinder 71b, the second center plate 73b, and the third cylinder 73c are stacked on each other in this order and welded together on their outer periphery as a single assembly which will also be referred to as a first casing below. The first casing is disposed coaxially or in alignment with the fourth cylinder 71d which will also be referred to as a second casing. The first casing and the second casing are arranged in this way to form a shell or casing of the pump body 100. The third cylinder 71c and the fourth cylinder 71d have holes or recesses 74a and 74b formed in surfaces thereof facing each other. A pin 74c is fit in the recesses 74a and 74b to lock the rotation of the third cylinder 71c and the fourth cylinder 71d and position the third cylinder 71c and the fourth cylinder 71d in a circumferential direction thereof.

The pump body 100 is assembled in the way, as described above, and fitted from the right side of the drawing into a substantially cylindrical mount chamber 101a formed in the housing 101 of the actuator 50. Such a fitting direction will also be referred to as an insertion direction below.

The mount chamber 101a has an internal thread 101b formed in an inner end wall thereof. An annular screw 102 which has an external thread is fastened into engagement with the internal thread 101b to retain the pump body 100 in the housing 101 firmly.

The housing 101 also has a cylindrical center chamber 101c formed in a central portion of the bottom of the mount chamber 101a which is aligned with a shaft 54 (i.e., an output shaft) of the motor 60. In other words, the center chamber 101c is located coaxially with the shaft 54. The center chamber 101c will also be referred to as a second chamber below. The second chamber 101c has a first bearing 51 fit therein. An area of the bottom of the mount chamber 101a other than the second chamber 101c are in contact abutment with the end surface of the first cylinder 71a.

The first to fourth cylinders 71a to 71d have a first, a second, a third, and a fourth center holes 72a, 72b, 72c, and 72d, respectively. The first to fourth center holes 72a to 72d are aligned with each other to define a shaft hole into which the shaft 54 is inserted. The shaft 54 is retained to be rotatable by the first bearing 51 and the second bearing 52 which are mounted in the first center hole 72a of the first cylinder 71a and the fourth center hole 72d of the fourth cylinder 71d, respectively.

Figure 3:
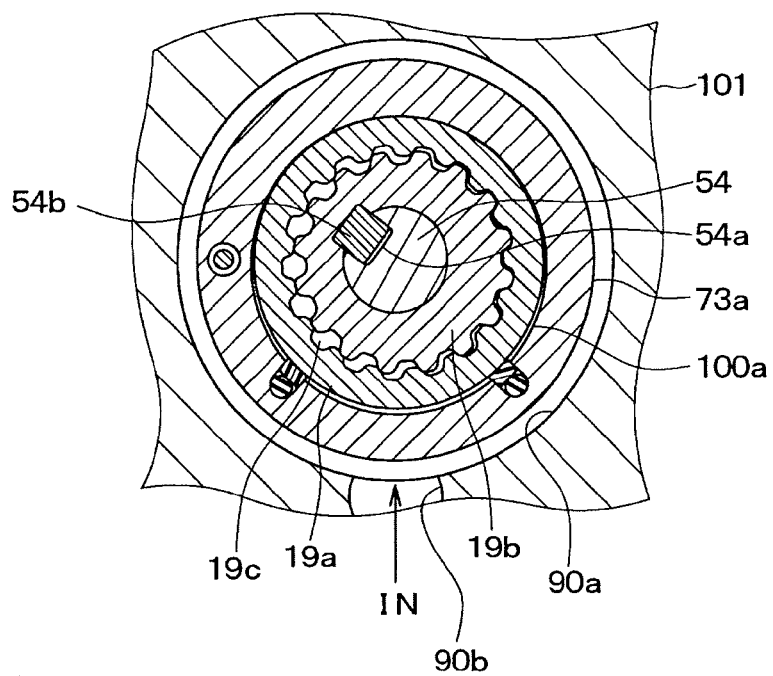
FIG. 3 is a traverse sectional view, as taken along the line III-III in FIG. 2.

The gear pumps 19 and 39 are arranged between the first and second bearings 51 and 52. The structure of the gear pumps 19 and 39 will be described below with reference to FIG. 3.

The gear pump 19 is disposed in a rotor chamber 100a defined in the first center plate 73a sandwiched between the first and second cylinders 71a and 71b. The gear pump 19 is implemented by an internal gear trochoid pump which is driven by the shaft 54 of the motor 60.

Specifically, the gear pump 19 is equipped with a rotating assembly made up of an outer rotor 19a and an inner rotor 19b. The shaft 54 is fit in a center hole of the inner rotor 19b. A key 54b is fit in a hole 54a formed in the shaft 54 and works to transmit torque of the shaft 54 to the inner rotor 19b. The outer rotor 19a has inner teeth formed on an inner periphery thereof. The inner rotor 19b has outer teeth formed on an outer periphery thereof. The inner teeth of the outer rotor 19a mesh with the outer teeth of the inner rotor 19b so as to create a plurality of gaps or enclosed cavities 19c therebetween. The cavities 19c are changed in volume thereof with rotation of the shaft 54, thereby sucking or discharging the brake fluid.

The gear pump 39 is, like the gear pump 19, disposed in a rotor chamber 100b defined in the second center plate 73b sandwiched between the second and third cylinders 71b and 71c. The gear pump 39 is implemented by an internal gear trochoid pump and, like the gear pump 19, includes a rotating assembly made up of an outer rotor 39a and an inner rotor 39b. The outer rotor 39a has inner teeth formed on an inner periphery thereof. The inner rotor 39b has outer teeth formed on an outer periphery thereof. The inner teeth of the outer rotor 39a mesh with the outer teeth of the inner rotor 39b so as to create a plurality of gaps or enclosed cavities 39c therebetween. The cavities 39c are changed in volume thereof with rotation of the shaft 54, thereby sucking or discharging the brake fluid. The gear pump 39 is located at an angular position which is 180° away from the gear pump 19 around the axis of the shaft 54. In other words, the layout of the cavities 39c is diametrically opposed to, that is, symmetrical with that of the cavities 19c of the gear pump 19 about the axis of the shaft 54. This cancels high pressures of the brake fluid against each other which are developed at outlets of the gear pumps 19 and 39 and adversely exerted on the shaft 54.

The second cylinder 71b, as illustrated in FIG. 2, has formed therein an inlet port 80 which communicates with one(s) of the cavities 19c of the gear pump 19 through which the brake fluid is sucked into the gear pump 19. The inlet port 80 is formed in an end surface of the second cylinder 71b which faces the gear pump 19 and extends to the outer periphery of the second cylinder 71b. The housing 101 has an annular groove 90a formed in an inner wall thereof exposed to the mount chamber 101a. The annular groove 90a is fully closed, that is, extends over the whole of the circumference of the mount chamber 101a. The housing 101 also has formed therein an inlet path 90b which communicates with the inlet port 80 through a portion of the annular groove 90a. The gear pump 19 sucks the brake fluid from outside thereof through the inlet path 90b, the annular groove 90a, and the inlet port 80.

The first cylinder 71a, as illustrated in FIG. 2, has formed therein an outlet port 81 which communicates with one(s) of the cavities 19c of the gear pump 19 through which the brake fluid is discharged from the gear pump 19. The outlet port 81 extends from one of opposed end surfaces of the first cylinder 71a which faces the gear pump 19 to the other end surfaces, that is, passes through the thickness of the first cylinder 71a. The housing 101 has formed therein an outlet path 91 which leads to the bottom of the mount chamber 101a. The outlet port 81 is connected to the outlet path 91. The gear pump 19 works to output the brake fluid outside the pump body 100 from the bottom of the mount chamber 101a through the outlet port 81 and the outlet path 91. More specifically, the outlet port 81 has the following structure.

The outlet port 81 includes a hole which, as described above, extends through the thickness of the first cylinder 71a and an annular groove 110 formed in the end surface of the first cylinder 71a which faces the gear pump 19. The annular groove 110 surrounds the shaft 54.

Specifically, a seal ring 111 is so disposed in the annular groove 110 as to elastically press the outer rotor 19a and the inner rotor 19b. The seal ring 111 is made of an assembly of a resinous member 111a and a rubber member 111b. The resinous member 111a is arranged closer to the outer rotor 19a and the inner rotor 19b (i.e., the gear pump 19) than the rubber member 111b is. The rubber member 111b is disposed to press the resinous member 111a against the gear pump 19. One or more of the cavities 19c which serve as the inlet of the gear pump 19, that is, communicates with the inlet port 80 and a portion of a clearance which is created between the outer periphery of the outer rotor 19a and the first center plate 73a and opposed to the one(s) of the cavities 19c serving as the inlet of the gear pump 19 in the radial direction of the gear pump 19 are located on the inner side of the seal ring 111, while one(s) of the cavities 19c which serves as the outlet of the gear pump 19, that is, communicates with the outlet port 81 and a portion of the clearance which is created between the outer periphery of the outer rotor 19a and the first center plate 73a and opposed to the one(s) of the cavities 19c serving as the outlet of the gear pump 19 in the radial direction of the gear pump 19 are located on the outer side of the seal ring 111. In other words, the seal ring 111 has a sealing surface which contacts with the end surface of the gear pump 19 to hermetically isolate a lower-pressure portion and a higher-pressure portion of the gear pump 19 from each other.

The seal ring 111 is placed in direct contact with the whole of an inner circumference of the annular groove 110 and partially in direct contact with an outer circumference of the annular groove 110. Specifically, a gap is created between the outer circumference of the annular groove 110 and a portion of the outer circumference of the seal ring 111. In other words, the annular groove 110 has a region where the annular groove 110 is separate from the outer circumference of the seal ring 111 and where the brake fluid is permitted to flow. The outlet port 81 includes such a region of the annular groove 110.

The first cylinder 71a has a connecting path 81a formed on the front end surface (i.e., the left end surface, as viewed in FIG. 2) thereof in the insertion direction, as described above. The connecting path 81a communicates between the outlet port 81 and the outlet path 91. The connecting path 81a extends around the whole of the circumference of the first bearing 51, thereby ensuring the stability of the fluid communication between the outlet port 81 and the outlet path 91 regardless of the angular location of the outlet path 91 in the first cylinder 71a. Specifically, in assembling of the first cylinder 71a into the housing 101 in the absence of the connecting path 81a, when the first cylinder 71a is put on the bottom of the mount chamber 101a, it may result in no gap between the end surface of the first cylinder 71a and the bottom of the mount chamber 101a, that is, failure in communication between the outlet port 81 and the outlet path 91. In order to eliminate this problem, a groove is formed in the end surface of the first cylinder 71a to define the connecting path 81a which establishes the fluid communication between the outlet port 81 and the outlet path 91.

The second cylinder 71b, as illustrated in FIG. 2, has an inlet port 82 formed in the end surface thereof which is opposed to the end surface in which the inlet port 80 is formed. The inlet port 82 communicates with one(s) of the cavities 39c of the gear pump 39 through which the brake fluid is sucked into the gear pump 39. The inlet port 82 is formed in the end surface of the second cylinder 71b which faces the gear pump 39 and extends to the outer periphery of the second cylinder 71b. The housing 101 has an annular groove 92a formed in the inner wall thereof exposed to the mount chamber 101a. The annular groove 92a is fully closed, that is, extends over the whole of the circumference of the mount chamber 101a. The housing 101 also has formed therein an inlet path 92b which communicates with the inlet port 82 through a portion of the annular groove 92a. The gear pump 39 sucks the brake fluid from outside thereof through the inlet path 92b, the annular groove 92a, and the inlet port 82.

The third cylinder 71c, as illustrated in FIG. 2, has formed therein an outlet port 83 which communicates with one(s) of the cavities 39c of the gear pump 39 through which the brake fluid is discharged from the gear pump 39. The outlet port 83 extends from one of opposed end surfaces of the third cylinder 71c which faces the gear pump 39 to the other end surfaces, that is, passes through the thickness of the third cylinder 71c. The housing 101 has formed therein an outlet path 93 which leads to the inner periphery of the mount chamber 101a. The outlet port 83 is connected to the outlet path 93 through a gap 94 between the third cylinder 71c and the fourth cylinder 71d. The gear pump 39 works to output the brake fluid outside the outer periphery of the pump body 100 through the outlet port 83, the gap 94, and the outlet path 93. More specifically, the outlet port 83 has the following structure.

The outlet port 83 includes a hole which, as described above, extends through the thickness of the third cylinder 71c and an annular groove 112 formed in the end surface of the third cylinder 71c which faces the gear pump 39. The annular groove 112 surrounds the shaft 54.

Specifically, a seal ring 113 is so disposed in the annular groove 112 as to extend partially around the outer rotor 39a and the inner rotor 39b. The seal ring 113 is made of an assembly of a resinous member 113a and a rubber member 113b. The resinous member 113a is arranged closer to the outer rotor 39a and the inner rotor 39b (i.e., the gear pump 39) than the rubber member 113b is. The rubber member 113b is disposed to press the resinous member 113a against the gear pump 39. One(s) of the cavities 39c which serves as the inlet of the gear pump 39, that is, communicates with the inlet port 82 and a portion of a clearance which is created between the outer periphery of the outer rotor 39a and the second center plate 73b and opposed to the one(s) of the cavities 39c serving as the inlet of the gear pump 39 in the radial direction of the gear pump 39 are located on the inner side of the seal ring 113, while one(s) of the cavities 39c which serves as the outlet of the gear pump 39, that is, communicates with the outlet port 83 and a portion of the clearance which is created between the outer periphery of the outer rotor 39a and the second center plate 73b and opposed to the one(s) of the cavities 39c serving as the outlet of the gear pump 39 in the radial direction of the gear pump 39 are located on the outer side of the seal ring 113. In other words, the seal ring 113 has a sealing surface which contacts with the end surface of the gear pump 39 to hermetically isolate a lower-pressure portion and a higher-pressure portion of the gear pump 39 from each other.

The seal ring 113 is placed in direct contact with the whole of an inner circumference of the annular groove 112 and partially in direct contact with an outer circumference of the annular groove 112. Specifically, a gap is created between the outer circumference of the annular groove 112 and a portion of the outer circumference of the seal ring 113. In other words, the annular groove 112 has a region where the annular groove 112 is separate from the outer circumference of the seal ring 113 and where the brake fluid is permitted to flow. The outlet port 83 includes such a region of the annular groove 112.

The inlet path 90b and the outlet path 91 in FIG. 2 correspond to the hydraulic line C in FIG. 1. The inlet path 92b and the outlet path 93 in FIG. 2 correspond to the hydraulic line G in FIG. 1.

The pump body 100 also includes a seal ring 120. The second center hole 72b of the second cylinder 71b has a diameter partially greater than that of the shaft 54. In other words, the second cylinder 71b has a cylindrical chamber formed in the second center hole 72b in which the seal ring 120 is disposed. The seal ring 120 serves to hermetically isolate the gear pump 19 and the gear pump 39 from each other. The seal ring 120 is made up of an O-ring 120a and a resinous ring 120b. The resinous ring 120b has an annular groove formed in an outer circumference thereof. The O-ring 120a is mounted in the annular groove of the resinous ring 120b and elastically presses the resinous ring 120b against the periphery of the shaft 54 to create a hermetical seal around the shaft 54.

Additionally, the pump body 100 also includes a seal ring 130 serving as a sealing member. The third center hole 72c of the third cylinder 71c has a diameter partially greater than that of the shaft 54. In other words, the third cylinder 71c has a cylindrical chamber formed in the third center hole 72c in which the seal ring 130 is disposed. The seal ring 130 serves to hermetically isolate the gear pump 39 from outside the housing 101. The pump body 100 also includes a pressure member 140 disposed within the third center hole 72c closer to the gear pump 39 than the seal ring 130 is. The pressure member 140 works to mechanically urge the seal ring 130 away from the gear pump 39 in the axial direction of the shaft 54. The seal ring 130 and the pressure member 140 are designed to have features of the invention. The structures of the seal ring 130 and the pressure member 140 will be described later in detail.

The pump body 100 also includes an oil seal 150 which is fit on the shaft 54 and located closer to the motor 60 than the seal ring 130 is, that is, on the opposite side of the seal ring 130 to the gear pump 39. The seal ring 130 and the oil seal 150 serve as a double seal mechanism.

The seal ring 130 serves to avoid the leakage of the brake fluid from the center hole 72c outside the pump body 100. Additionally, the oil seal 150 blocks a possible leakage of the brake fluid through the seal ring 130.

The third cylinder 71c, as clearly illustrated in FIG. 2, has a large-diameter portion and a small-diameter portion which is fit in the fourth cylinder 71d. Specifically, the small-diameter portion has a diameter less than the inner diameter of the mount chamber 101a and is fit in the center hole 72d of the fourth cylinder 71d. The small-diameter portion of the third cylinder 71c has an annular groove 74d in which an O-ring 74e is fit. The O-ring 74e works to block the leakage of the brake fluid to the second bearing 52 through a clearance between the third cylinder 71c and the fourth cylinder 71d.

Specifically, the fourth cylinder 71d has a cylindrical chamber formed in the center hole 72d into which the small-diameter portion of the third cylinder 71c is inserted. The cylindrical chamber has a depth shorter than the length of the small-diameter portion of the third cylinder 71c, so that an air gap is created between mutually facing end surfaces of the third cylinder 71c and the fourth cylinder 71d. The brake fluid discharged from the outlet port 83 of the gear pump 39 is delivered to the outlet path 93 through the gap 94.

O-rings 75a, 75b, 75c, and 75d are fit on outer peripheries of the first to fourth cylinders 71a to 71d. The O-rings 75a to 75d serve to hermetically block the leakage of the brake fluid from the inlet paths 90b and 92b and the outlet paths 91 and 93 in the housing 101. Specifically, the O-ring 75a is disposed between the inlet path 90b and the outlet path 91. The O-ring 75b is disposed between the inlet path 90b and the inlet path 92b. The O-ring 75c is disposed between the inlet path 92b and the outlet path 93. The O-ring 75d is disposed between the outlet path 93 and the end surface of the housing 101 which faces the motor 60.

The fourth cylinder 71d, as clearly illustrated in FIG. 2, has a large-diameter portion, a small-diameter portion, and a shoulder between the large-diameter portion and the small-diameter portion. The small-diameter portion is located closer to the opening of the mount chamber 101a (i.e., the motor 60) than the large-diameter portion is. The annular screw 102 (i.e., a retainer) is fit on the small-diameter portion of the fourth cylinder 71d in abutment with the shoulder in thread engagement with the housing 101, thereby retaining the pump body 100 in the housing 101 firmly.

The structures of the seal ring 130 and the pressure member 140 will be described below along with the structure of the third center hole 72c with reference to FIGS. 4 to 10.

The installation of the seal ring 130 in the third center hole 72c is achieved by fitting the seal ring 130 into the third center hole 72c in an axial direction of the shaft 54 which is opposite the insertion direction, as described above. The third cylinder 71c (i.e., the pump housing) has a small-diameter portion 210 which extends inside the third center hole 72c and whose inner diameter is smaller than that of a major portion of the third center hole 72c. The small-diameter portion 210 is located farther away from the gear pump 39 than from the seal ring 130 and has an inner shoulder surface which is a portion of the inner surface of the third center hole 72c and faces the gear pump 39. The small-diameter portion 210 has an inner end which is separate from the outer periphery of the shaft 54 through a gap. The seal ring 130 is pressed against the inner shoulder surface of the small-diameter portion 210. In other words, the small-diameter portion 210 serves as a stopper wall to hold the seal ring 130. The small-diameter portion 210 will also be referred to as a stopper wall below.

Figure 4:
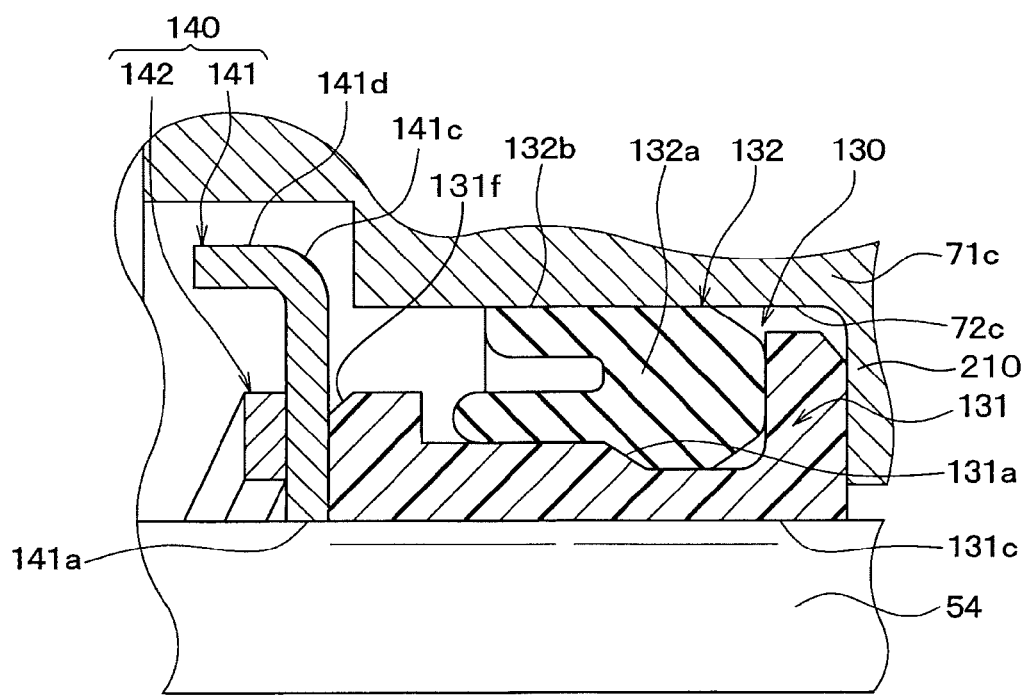
FIG. 4 is a partially enlarged vertical view which shows a configuration of a sealing member installed in the rotating pumping apparatus of FIG. 2.

The seal ring 130 is, as clearly illustrated in FIG. 4, made of an assembly of a resinous ring 131 and an annular rubber cup 132. The resinous ring 131 is made of, for example, polytetrafluoroethylene (PTFE). The rubber cup 132 is made of, for example, ethylene propylene diene rubber (EPDM) and works as an elastic seal. The rubber cup 132 is fit in a groove formed in the resinous ring 131. The rubber cup 132 elastically presses the resinous ring 131 against the outer periphery of the shaft 54, thereby creating a hermetical seal between the third cylinder 71c and the shaft 54.

Figure 7:
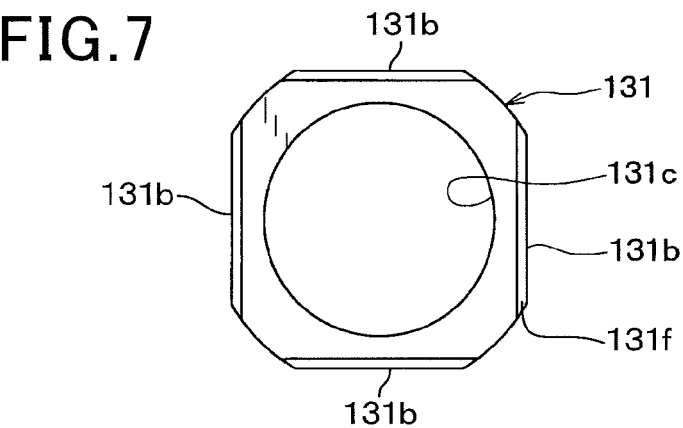
FIG. 7 is an illustration of a resinous ring of a sealing member, as viewed in an axial direction of a pump shaft.

Specifically, the resinous ring 131 has a storage groove 131a formed in the outer periphery thereof. The storage groove 131a has a given depth in a radial direction of the resinous ring 131. The rubber cup 132 is disposed within the storage groove 131a to complete the seal ring 130. The end of the resinous ring 131 which is, as illustrated in FIG. 4, placed in direct contact with the pressure member 140 has, as illustrated in FIGS. 4 and 7, four chamfered edges 131f. The resinous ring 131 used in this embodiment is, although not limited to, square in cross section and, as illustrated in FIGS. 4 and 7, has four fitting portions 131b formed on an outer periphery of an end portion thereof facing the pressure member 140 for stopping the seal ring 130 from rotating following rotation of the shaft 54. Specifically, the fitting portions 131b are defined by, for example, flat areas on four peripheral side surfaces of the resinous ring 131 which are close to or continue to the chamfered edges 131f of the resinous ring 130. Specifically, at least two of the fitting portions 131b which are diametrically opposed to each other, that is, located on opposite sides of the resinous ring 131 engage the pressure member 140 to stop the resinous ring 131 (i.e., the seal ring 130) from rotating. The resinous ring 131 of this embodiment has, as described above, the four sides and the four fitting portions 131b provided on the sides, respectively, but may be equipped with at least two fitting portions 131b. It is advisable that distances between two pairs of the opposite sides of the resinous ring 131 be equal to each other, and the four fitting portions 131b be provided, one on each of the sides. This configuration permits at least any two of the fitting portions 131b which are diametrically opposed to each other to physically engage the pressure member 140 regardless of angular orientation of the resinous ring 131 relative to the pressure member 140. The resinous ring 131 has a center hole 131c formed in alignment with the axis thereof. The shaft 54 passes through the center hole 131c with an outer periphery thereof being in direct contact with the inner periphery of the center hole 131c to create a hermetical seal between the shaft 54 and the resinous ring 131.

The rubber cup 132, as described above, serves as an elastic seal and is, as can be seen in FIG. 4, mounted in the storage groove 131a of the resinous ring 131. The rubber cup 132 is elastically compressed between the resinous ring 131 and the third cylinder 71c, thereby developing an elastic reactive force to press the inner peripheral surface of the resinous ring 131 against the outer peripheral surface of the shaft 54 to create a hermetical seal between the resinous ring 131 and the shaft 54.

Specifically, the rubber cup 132 is of a V-shape in cross section which is made up of a thick annular base 132a and a lip mold 132b. The rubber cup 132 is fit in the storage groove 131a of the resinous ring 131 with lips of the lip mold 132b, as clearly illustrated in FIG. 4, extending from the annular base 132a toward the gear pump 39. The annular base 132a is elastically compressed between the resinous ring 131 and the inner periphery of the third cylinder 71c, thereby creating an elastic reactive force to press the inner peripheral surface of the resinous ring 131 against the outer peripheral surface of the shaft 54 to establish a hermetical seal between the resinous ring 131 and the shaft 54. When the hydraulic pressure on the side of the gear pump 39 is elevated, the lips of the lip mold 132b are widened, so that they press the resinous ring 131 and the third cylinder 71c, thereby creating a hermetical seal between the resinous ring 131 and the inner wall of the third center hole 72c. This avoids the leakage of brake fluid outside the third cylinder 71c from a clearance between the shaft 54 and the third center hole 72c.

The pressure member 140 is, as clearly illustrated in FIGS. 2 and 4, disposed on the top end of the resinous ring 131 which faces the gear pump 39. The pressure member 140 is made of an assembly of a plate 141 and a plate spring 142.

The plate 141 has a wide area placed in contact with the end surface of the resinous ring 131 and works as a pressure plate which urges the seal ring 130 into constant abutment with the stopper wall 210 of the third cylinder 72c with the aid of elastic pressure, as produced by the spring plate 142. For instance, the plate 141 is made by machining a metallic plate. The plate 141, as illustrated in FIGS. 4 and 8A, has formed in the center thereof a circular center hole 141a through which the shaft 54 passes.

Figure 5:
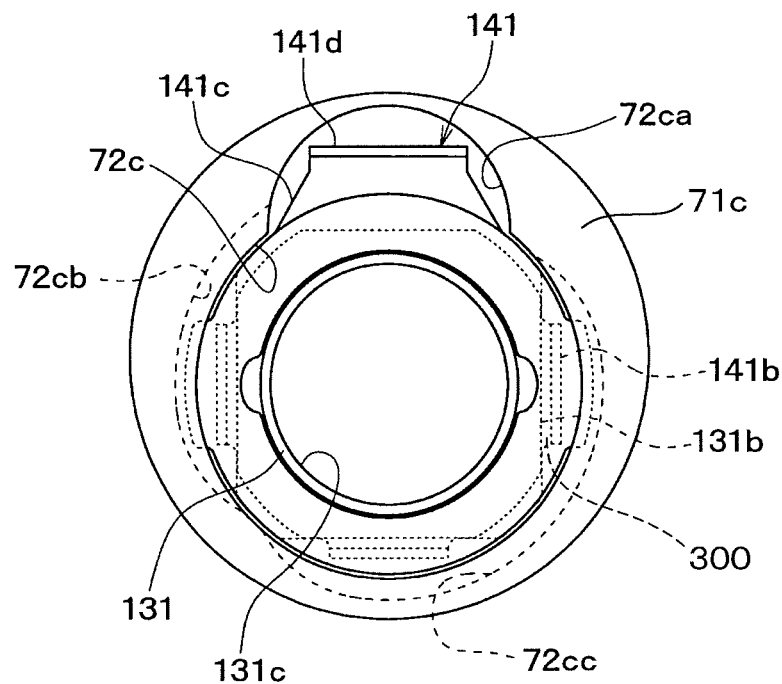
FIG. 5 is an illustration of an assembly of a sealing ring and a pressure member installed in a center hole of a pump casing, as viewed in an axial direction of a pump shaft.
Figure 6:
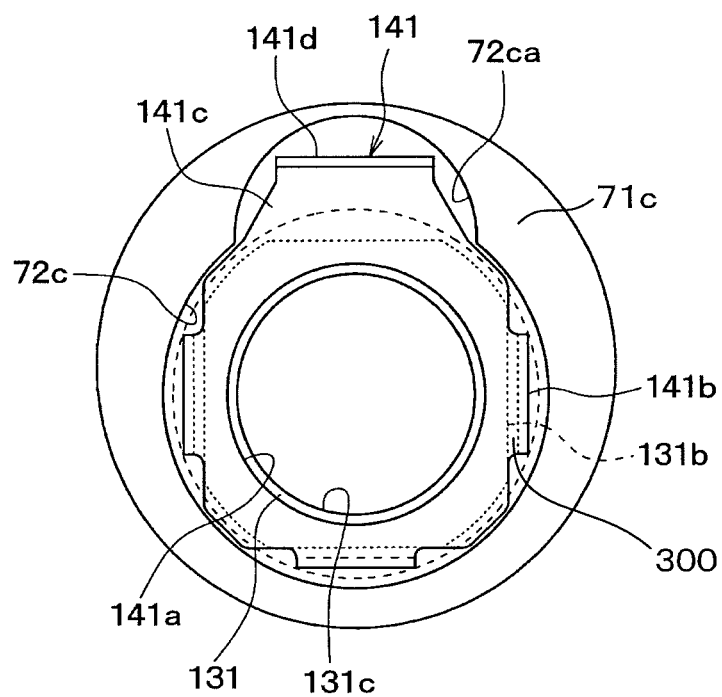
FIG. 6 is an illustration of an assembly of a sealing ring and a plate of a pressure member installed in a center hole of a pump casing, as viewed in an axial direction of a pump shaft.
Figure 8A:
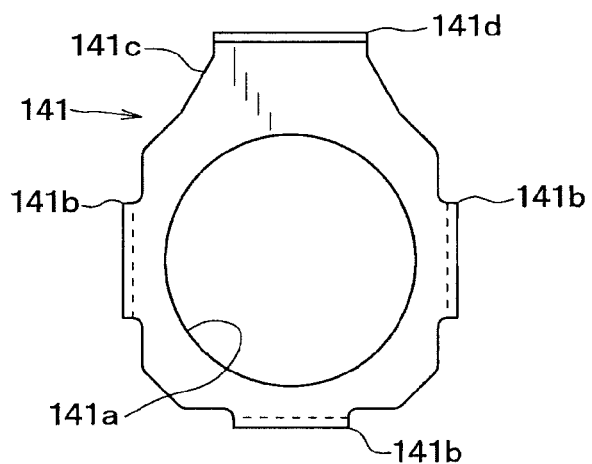
FIG. 8A is an illustration of a plate of a pressure member, as viewed in an axial direction of a pump shaft.
Figure 8B:
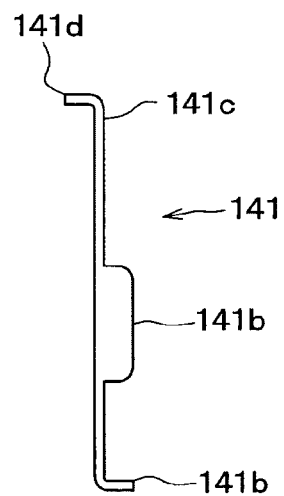
FIG. 8B is a side view of the plate in FIG. 8A.

The plate 141, as can be seen in FIGS. 8A and 8B, has a substantially quadrangle outer edge with four sides. The plate 141 is equipped with rotation stoppers 141b formed in the shape of a tab on at least opposite two of the four sides thereof. In this embodiment, the plate 141 has the rotation stoppers 141b extending from three of the four sides thereof. Each of the rotation stoppers 141b is bent from a major body of the plate 141 toward the resinous ring 131. Each of the rotation stoppers 141b is, as can be seen in FIGS. 5 and 6, disposed over a corresponding one of the fitting portions 131b through a small air gap 300 for facilitating assembling the plate 141 and the resinous ring 131, but may be fit directly on the fitting portions 131b of the resinous ring 131.

The plate 141 also has a plate-rotation stopper 141c formed on one of the four sides thereof where the rotation stoppers 141b are not formed. The plate-rotation stopper 141c has a given length which extends radially from the center hole 141a of the plate 141 and is longer than those of the rotation stopper 141b. In other words, the plate-rotation stopper 141c is formed by a portion of the plate 141 which protrudes in a planar direction of the plate 141, that is, a direction perpendicular to the thickness of the plate 141. The plate-rotation stopper 141c has formed on an end thereof a tab 141d which is bent to extend in a direction opposite the direction in which the rotation stoppers 141b extend from the major body of the plate 141. The tab 141d serves as a reinforcement to enhance the mechanical strength or stiffness of the plate-rotation stopper 141c. The third center hole 72c of the third cylinder 71c has a portion in which the seal ring 130 and the plate 141 are disposed and which is greater in diameter than the resinous ring 131 and also has a radius greater than the length of the plate-rotation stopper 141c (i.e., the distance between the center of the hole 141a of the plate 141 and the tab 141d of the plate-rotation stopper 141c). The third cylinder 71c (i.e., the pump casing), as illustrated in FIGS. 5 and 6, has formed therein a domed cut-out groove 72ca which defines a portion of the third center hole 72c, in other words, forms a chamber which is exposed to the third center hole 72c and within which the plate-rotation stopper 141c is disposed.

The plate-rotation stopper 141c will also be referred to as a first rotation stopper below. The rotation stoppers 141b will also be referred to as a second rotation stopper below.

The plate 141 of the pressure member 140 functions as an antirotation member to stop the seal ring 130 from rotating following rotation of the shaft 54. Specifically, the rotation stoppers 141b of the plate 141 are fit on the fitting portions 131b of the resinous ring 131. When the seal ring 130 rotates, the plate-rotation stopper 141c of the plate 141 hits the inner wall of the cut-out groove 72ca, thus stopping the plate 141 (i.e., the pressure member 140) from rotating further. This avoids the mechanical wear of the seal ring 130 which arises from the rotation of the seal ring 130 following the rotation of the shaft 54, thus resulting in an increase in service life of the seal ring 130.

The plate 141 is, as described above, designed to have a large area placed in direct contact with the end surface of the resinous ring 131 in order to increase an area of the resinous ring 131 against which the plate 141 presses with aid of the plate spring 142, but however, it may be omitted. In other words, only the plate spring 142 is used to press the resinous ring 131 against the stopper wall 210 of the third cylinder 71c. The use of the plate 141, however, results in an increase in area of the end surface of the resinous ring 131 on which the pressure, as produced by the plate spring 142, is exerted and also in uniform distribution of such pressure over the resinous ring 131, thereby minimizing undesirable deformation of the resinous ring 131 which usually arises from local application of the pressure, as produced by the plate spring 142, to the resinous ring 131.

Figure 9A:
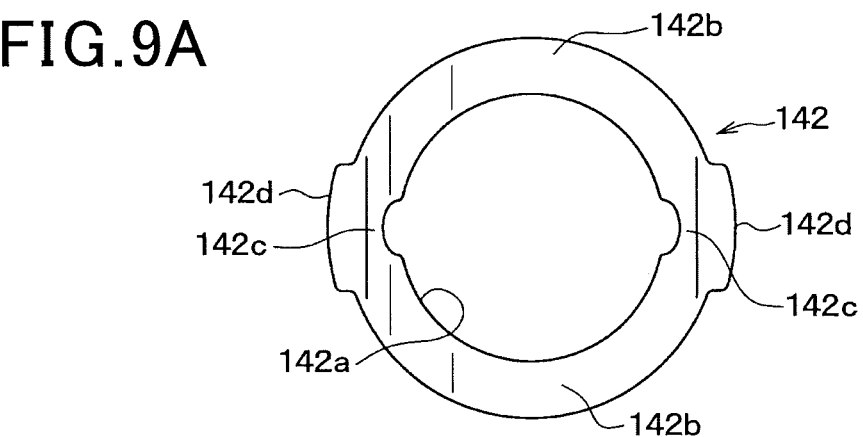
FIG. 9A is an illustration of a plate spring of a pressure member, as viewed in an axial direction of a pump shaft.
Figure 9B:
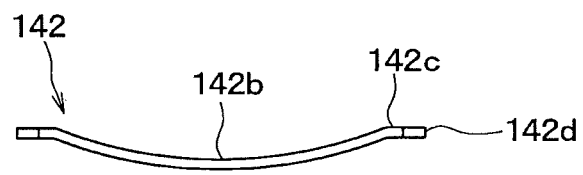
FIG. 9B is a side view of the plate spring in FIG. 9A.
Figure 10:
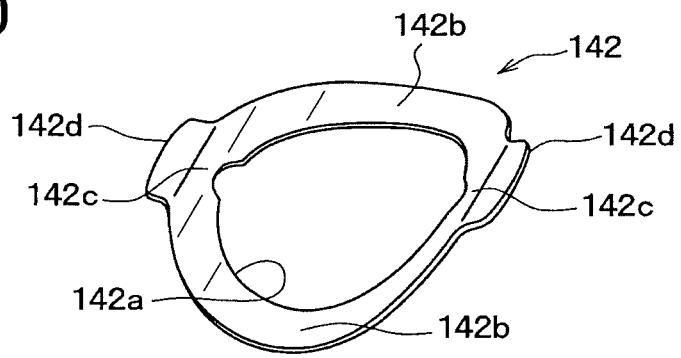
FIG. 10 is an exploded perspective view of an assembly of a plate and a plate spring of a pressure member.
Figure 10:
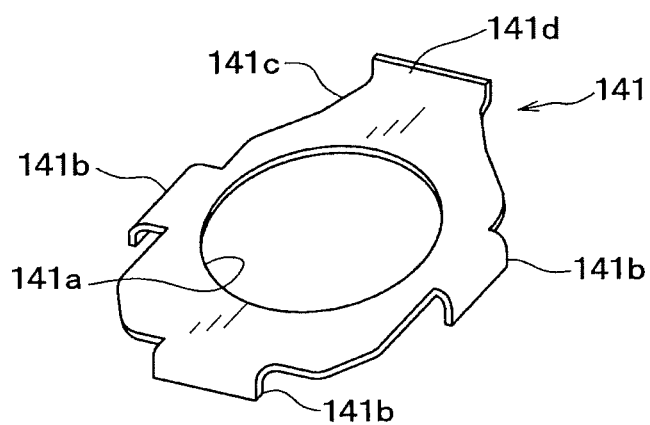

The plate spring 142 is disposed on the opposite side of the plate 141 to the seal ring 130 and works to press the plate 141 to bring the seal ring 130 into constant abutment with the stopper wall 210 of the third cylinder 71c. For instance, the plate spring 142 is, as illustrated in FIGS. 9A and 9B, made of a curved washer formed by bending a metallic disc with the center hole 142a. Specifically, the metallic disc is curved around the center hole 142a so as to form two troughs (i.e., concave portions) 142b diametrically opposed to each other, that is, located symmetrically with respect to the center of the center hole 142a. In the assembly of the plate 141 and the plate spring 142, the troughs 142b bulge toward the plate 141 in contact therewith. The plate spring 142 also has two protruding tabs 142c which are diametrically opposed to each other along a line which extends perpendicular to a line passing the troughs 142b through the center of the center hole 142a. In other words, each of the protruding tabs 142c is located at an angle of 90° away from either of the troughs 142b. The protruding tabs 142c bulge in a direction opposite a direction in which the troughs 142b bulge.

Each of the protruding tabs 142c of the plate spring 142 has a support 142d formed on a portion of the outer periphery of the plate spring 142. The supports 142d work to retain the plate spring 142 firmly in the third cylinder 71c. The supports 142d protrude from the outer edge of a major portion of the plate spring 142 in opposite directions. The third cylinder 71c, as clearly illustrated in FIG. 5, has circumferential grooves 72cb and 72cc formed in the inner wall thereof defining the third center hold 72c. The circumferential grooves 72cb and 72cc extend in a circumferential direction of the shaft 54 and are located diametrically opposed to each other. The protruding tabs 142c of the plate spring 142 are fit in the circumferential grooves 72cb and 72cc, respectively, to secure the plate spring 142 to the third cylinder 71c.

Specifically, the circumferential groove 72cb extends from the cut-out groove 72ca along the outer circumference of the shaft 54, while the circumferential groove 73cc is physically separate from the cut-out groove 72ca and the circumferential groove 72cb. The circumferential groove 72cc is located between the cut-out groove 72ca and the circumferential groove 72cb in the circumferential direction of the shaft 54. The circumferential groove 72cc occupies a portion of the inner circumference of the third cylinder 71c which is diametrically opposed to the cut-out groove 72ca through the center of the shaft 54.

Each of the circumferential grooves 72cb and 72cc is designed to have a width which is slightly greater than the thickness of the supports 142d. Additionally, the circumferential grooves 72cb and 72cc have a depth selected so that the distance between the center axis (i.e., the longitudinal center line) of the shaft 54 and the bottom of each of the circumferential grooves 72cb and 72cc in the radial direction of the shaft 54 is substantially identical with the distance between the center of the center hole 142a of the plate spring 142 and the outer edge of each of the supports 142d in the radial direction of the shaft 54. The depth of the circumferential groove 72cb is, however, reduced so that the distance between the center axis of the shaft 54 and the bottom thereof decreases gradually at an end portion of the circumferential groove 72cb which is farther away from the cut-out groove 72ca. Similarly, the depth of the circumferential groove 72cc is reduced so that the distance between the center axis of the shaft 54 and the bottom thereof decreases gradually at both opposite end portions of the circumferential groove 72cc.

The location of each of the circumferential grooves 72cb and 72cc in the axial direction of the shaft 54 is so selected as to enable the plate spring 142 to elastically press the plate 141 against the seal ring 130, that is, as to elastically deform the plate spring 142. In other words, the minimum distance between each of the circumferential grooves 72cb and 72cc and the near side end of the resinous ring 131 (i.e., the end of the resinous ring 131 closer to the pressure member 140) in the axial direction of the shaft 54 is set shorter than the sum of thickness of the plate 141 and the plate spring 142 before being deformed elastically (i.e., the distance between opposite ends of the assembly of the plate 141 and the plate spring 142 before being deformed elastically in the axial direction of the shaft 54). Such layout and dimensions of the circumferential grooves 72cb and 72cc and the assembly of the plate 141 and the plate spring 142 causes the plate spring 142 to be deformed elastically in the axial direction of the shaft 54 when they are fitted in the circumferential grooves 72cb and 72cc, thereby creating an elastically reactive force to urge the plate 141 into constant abutment with the end surface of the resinous ring 131. This presses the resinous ring 131 against the stopper wall 210 of the third cylinder 71c to hold the seal ring 130 from moving undesirably in the axial direction of the shaft 54.

The seal ring 130 and the pressure member 140 are inserted into and fixed firmly in the third center hole 72c in the following steps.

The rubber cup 132 is fitted on the outer periphery of the resinous ring 131 to complete the seal ring 130. The seal ring 130 is then inserted into the third center hole 72c. Subsequently, the plate 141 is installed in the third center hole 72c. Specifically, the plate 141 is placed with the surface from which the rotation stoppers 141b protrude being oriented toward the seal ring 130 and the plate-rotation stopper 141c being disposed within the cut-out groove 72ca of the third center hole 72c. This causes the rotation stoppers 141b to be fitted on or over the fitting portions 131b of the resinous ring 131, holds the plate 141 from rotating, and stops the resinous ring 131 from rotating following rotation of the shaft 54.

Next, the plate spring 142 is fitted into the third center hole 72c. Specifically, the plate spring 142 is, as clearly illustrated in FIG. 10, oriented with the troughs 142b facing the plate 141. One of the supports 142d is then fitted into the circumferential groove 72cc, after which the other support 142d is inserted into the circumferential groove 72cb from the end thereof closer to the cut-out groove 72ca. The plate spring 142 is rotated about the center axis of the shaft 54 to slide the supports 142d within the circumferential grooves 72cb and 72cc until the plate spring 142 is in orientation, as illustrated in FIG. 5. The supports 142d are, therefore, retained within the circumferential grooves 72cb and 72cc, so that the plate spring 142 is elastically deformed between the plate 141 and the circumferential grooves 72cb and 72cc, thereby causing the plate spring 142 to develop an elastically reactive force which urges the seal ring 130 into constant abutment with the stopper wall 210 of the third cylinder 71c through the plate 141.

The seal ring 130 and the pressure member 140 are installed in the third center hole 72c in the above way and secured to the third cylinder 71c. The elastically reactive force, as produced by the plate spring 142, presses the seal ring 130 against the stopper wall 210 of the third cylinder 71c, thereby holding the seal ring 130 from moving in the axial direction of the shaft 54.

The pressure member 140, as described already, may be made only of the plate spring 142. The use of the plate 141, however, results in an increase in area of the end surface of the resinous ring 131 on which the pressure, as produced by the plate spring 142, acts. The plate 141 is made of rigid metal plate and thus insensitive to local application of the pressure, as produced by the plate spring 142. The rotation stoppers 141b and the tab 141d are bent from a major surface of the plate 141 which extends parallel to the end surface of the resinous ring 131, thereby enhancing the stiffness of the plate 141 which resists the deformation thereof. This also minimizes the deformation of the resinous ring 131 and the plate 141 which arises from the pressure, as produced by the plate spring 142.

The rotating pumping apparatus is, as apparent from the above discussion, equipped with the seal ring 130, the pressure member 140, and the third cylinder 71c shaped to install the seal ring 130 and the pressure member 140 therein. In operation of the rotating pumping apparatus, the shaft 54 is rotated by the motor 60 to drive the gear pumps 19 and 39. The gear pumps 19 and 39 work to suck the brake fluid and discharge it to activate the anti-lock brake system (ABS) in the anti-lock brake control mode.

The pressure member 140, as described above, produces the elastic pressure to press the seal ring 130 against the stopper wall 210 of the third cylinder 71c. In fact, the elastic pressure is developed by the plate spring 142. This keeps the seal ring 130 from moving in the axial direction of the shaft 54 without relying on torque which is created by the rotation of the shaft 54 and exerted on the seal ring 130 or resistance to the rotation of the seal ring 130 which arises from the friction of the rubber ring 132 against the shaft 54.

The fitting portions 131b of the resinous ring 131 engage the rotation stoppers 141b of the pressure member 140. Additionally, the plate-rotation stopper 141c of the pressure member 140 is fit in the cut-out groove 72ca of the third cylinder 71c to hold the plate 141 from rotating, thus avoiding the rotation of the seal ring 130 following the rotation of the shaft 54. This structure, therefore, serves to stop the seal ring 130 from rotating and moving in the axial direction of the shaft 54 without use of pins, as used in the prior art structure described in the introductory part of this application.

While the present invention has been disclosed in terms of the preferred embodiment in order to facilitate better understanding thereof, it should be appreciated that the invention can be embodied in various ways without departing from the principle of the invention.

For instance, the plate spring 142 is made of a curved washer, but may be formed by another type of spring such as a waved washer, a disc spring, or a cantilever beam-shaped spring. The plate spring 142 is arranged at two points of contact with the plate 141, but may be at three or more points of contact. In this case, it is advisable that the three or more points of contact be located symmetrically with respect to the center axis of the shaft 54, in other words, arranged at the same angular intervals away from each other.

The rubber cup 132 that is an elastic seal installed or fit on the resinous ring 131 is, as described above, of a V-shape, but may be replaced with an O-ring.

The rotating pumping apparatus is equipped with the gear pumps 19 and 39, however, may alternatively be engineered to have other types of pumps such as vane pumps.

The casing which serves as an outer shell of the pump body 100 is, as described above, formed by the first, second, third, and fourth cylinder 71a, 71b, 71c, and 71d, but may be made up of another number of parts.

What is claimed is:

1. A rotating pumping apparatus comprising:
   a rotating pump;
   a shaft which drives the rotating pump;
   a casing which has formed therein a hole in which the shaft extends and rotates, the casing also including a stopper wall which extends inside the hole;
   a sealing member which is equipped with a ring and an elastic seal fit on the ring and disposed around the shaft to create a hermetical seal between an inner periphery of the hole and an outer periphery of the shaft; and
   a pressure member which includes a plate spring, a first rotation stopper, and a second rotation stopper, the plate spring working to elastically press the sealing member against the stopper wall of the casing to stop the sealing member from moving in an axial direction of the shaft, the first rotation stopper serving to stop the pressure member from rotating following rotation of the shaft, the second rotation stopper serving to engage the ring to stop the sealing member from rotating following the rotation of the shaft.

2. A rotating pumping apparatus as set forth in claim 1, wherein the plate spring is made of a disc spring with a center hole through which the shaft passes, the plate spring including a support which is formed by a protruding portion of an outer periphery of the disc spring, and wherein the casing has a groove formed in an inner wall which defines the hole in the casing, the groove extending in a circumferential direction of the shaft, the support of the plate spring being disposed in the groove.

3. A rotating pumping apparatus as set forth in claim 1, wherein the pressure member includes a plate which is disposed between the plate spring and the sealing member and works to transmit elastic pressure, as produced by the plate spring, to an end of the ring of the sealing member through itself, wherein the ring has a fitting portion formed on an outer periphery of an end portion thereof facing the pressure member, and wherein the second rotation stopper is formed by a portion of the plate which is bent toward the sealing member and engages the fitting portion of the ring.

4. A rotating pumping apparatus as set forth in claim 3, wherein the first rotation stopper is formed by a portion of the plate which protrudes in a planar direction of the plate, wherein the casing has formed therein a cut-out groove exposed to the hole, and wherein the first rotation stopper is disposed in the cut-out groove and hits an inner wall of the cut-out groove to stop the plate from rotating following the rotation of the shaft.

5. A brake system for a vehicle comprising:
   a brake actuating member;
   a master cylinder which works to produce a brake fluid pressure in response to an operation of the brake actuating member;
   a wheel cylinder which works to produce a brake force in response to the brake fluid pressure;
   a main hydraulic path which connects between the master cylinder and the wheel cylinder;
   a pressure-increasing valve which is disposed in the main hydraulic path and serves to control increasing of the brake fluid pressure applied to the wheel cylinder;
   a pressure-reducing path which connects with a junction of the pressure-increasing valve and the wheel cylinder in the main hydraulic path;
   a pressure-reducing valve which is disposed in the pressure-reducing path and works to control reducing of the brake fluid pressure applied to the wheel cylinder;

a reservoir which stores therein brake fluid which is discharged from the main hydraulic path through the pressure-reducing path when the pressure-reducing valve is opened;

a recirculating path which extends from the reservoir and connects with a junction of the master cylinder and the pressure-increasing valve;

a rotating pumping apparatus which includes (a) a rotating pump, (b) a shaft which drives the rotating pump, (c) a casing which has formed therein a hole in which the shaft extends and rotates, the casing also including a stopper wall which extends inside the hole, (d) a sealing member which is equipped with a ring and an elastic seal fit on the ring and disposed around the shaft to create a hermetical seal between an inner periphery of the hole and an outer periphery of the shaft, and (e) a pressure member which includes a plate spring, a first rotation stopper, and a second rotation stopper, the plate spring working to elastically press the sealing member against the stopper wall of the casing to stop the sealing member from moving in an axial direction of the shaft, the first rotation stopper serving to stop the pressure member from rotating following rotation of the shaft, the second rotation stopper serving to engage the ring to stop the sealing member from rotating following the rotation of the shaft; and a controller which performs an anti-lock brake control mode to increase or decrease the brake fluid pressure applied to the wheel cylinder to avoid skidding of a wheel of a vehicle, and returns the brake fluid from the reservoir to the main hydraulic path through the rotating pumping apparatus.

6. A rotating pumping apparatus as set forth in claim 5, wherein the plate spring is made of a disc spring with a center hole through which the shaft passes, the plate spring including a support which is formed by a protruding portion of an outer periphery of the disc spring, and wherein the casing has a groove formed in an inner wall which defines the hole in the casing, the groove extending in a circumferential direction of the shaft, the support of the plate spring being disposed in the groove.

7. A rotating pumping apparatus as set forth in claim 5, wherein the pressure member includes a plate which is disposed between the plate spring and the sealing member and works to transmit elastic pressure, as produced by the plate spring, to an end of the ring of the sealing member through itself, wherein the ring has a fitting portion formed on an outer periphery of an end portion thereof facing the pressure member, and wherein the second rotation stopper is formed by a portion of the plate which is bent toward the sealing member and engages the fitting portion of the ring.

8. A rotating pumping apparatus as set forth in claim 7, wherein the first rotation stopper is formed by a portion of the plate which protrudes in a planar direction of the plate, wherein the casing has formed therein a cut-out groove exposed to the hole, and wherein the first rotation stopper is disposed in the cut-out groove and hits an inner wall of the cut-out groove to stop the plate from rotating following the rotation of the shaft.

\* \* \* \* \*